(12) United States Patent
Domingo (10) Patent No.: US 9,145,638 B2
(45) Date of Patent: Sep. 29, 2015

(54) TIRE COMPRISING BANDED CARCASS REINFORCEMENT CABLES

(75) Inventor: Alain Domingo, Orleat (FR)

(73) Assignees: COMPAGNIE GENERALE DES ETABLISSEMENTS MICHELIN, Clermont-Ferrand (FR); Michelin Recherche et Technique S.A., Granges-Paccot (CH)

(*) Notice: Subject to any disclaimer, the term of this patent is extended or adjusted under 35 U.S.C. 154(b) by 456 days.

(21) Appl. No.: 13/513,829

(22) PCT Filed: Nov. 29, 2010

(86) PCT No.: PCT/EP2010/068410
§ 371 (c)(1),
(2), (4) Date: Aug. 14, 2012

(87) PCT Pub. No.: WO2011/067208
PCT Pub. Date: Jun. 9, 2011

(65) Prior Publication Data
US 2012/0298280 A1    Nov. 29, 2012

(30) Foreign Application Priority Data
Dec. 4, 2009    (FR) ...................... 09 58655

(51) Int. Cl.
| B60C 9/13 | (2006.01) |
| B60C 9/04 | (2006.01) |
| D07B 1/06 | (2006.01) |
| B60C 9/00 | (2006.01) |
| B60C 1/00 | (2006.01) |

(52) U.S. Cl.
CPC .............. *D07B 1/062* (2013.01); *B60C 1/0041* (2013.04); *B60C 9/005* (2013.04); *B60C 9/0007* (2013.04); *B60C 9/13* (2013.01); *B60C 2009/0269* (2013.04); *B60C 2009/0475* (2013.04); *B60C 2009/0483* (2013.04); *D07B 1/0626* (2013.01); *D07B 1/0633* (2013.01); *D07B 2201/208* (2013.01); *D07B 2201/2025* (2013.01); *D07B 2201/2032* (2013.01); *D07B 2201/2046* (2013.01); *D07B 2201/2081* (2013.01); *D07B 2201/2098* (2013.01)

(58) Field of Classification Search
CPC .... B60C 9/005; B60C 9/13; B60C 2009/0483
USPC ............. 152/451, 556, 557, 527; 57/210, 224
See application file for complete search history.

(56) References Cited

U.S. PATENT DOCUMENTS

| 2,598,033 | A | * | 5/1952 | Bourdon .......................... 57/212 |
| 4,543,298 | A | * | 9/1985 | Riedl .............................. 428/592 |
| 7,380,579 | B2 | * | 6/2008 | Esnault et al. ................. 152/451 |
| 2001/0023730 | A1 | | 9/2001 | Sinopoli et al. |
| 2006/0237110 | A1 | * | 10/2006 | Barguet et al. ................. 152/451 |

FOREIGN PATENT DOCUMENTS

| DE | 4120554 | * | 12/1992 |
| FR | 2795751 | | 1/2001 |
| FR | 2864556 | | 7/2005 |
| JP | 64-33288 | | 2/1989 |
| JP | 04-257381 | | 9/1992 |
| JP | 06-191207 | * | 7/1994 |
| JP | 2008-031561 | | 2/2008 |
| KR | 9504085 | * | 4/1995 |

* cited by examiner

Primary Examiner — Justin Fischer
Assistant Examiner — Robert Dye
(74) Attorney, Agent, or Firm — Cozen O'Connor (57) ABSTRACT

The invention relates to a tire having a radial carcass reinforcement, consisting of at least one layer of metal reinforcing elements, said tire including a top reinforcement, which is covered radially with a tread, said tread being joined to two beads via two sidewalls. According to the invention, the reinforcing elements of at least one carcass reinforcement layer are metal cables which, in the so-called permeability test, have a flow rate less than 20 cm$^3$/mn and at least 10% of said metal cables are banded by a strand consisting of multifilament textile fibers.

14 Claims, 3 Drawing Sheets

TIRE COMPRISING BANDED CARCASS REINFORCEMENT CABLES

RELATED APPLICATIONS

This is a U.S. national stage of application No. PCT/EP2010/068410, filed on Nov. 29, 2010. Priority is claimed on the following applications: French Application No. 09/58655 filed on Dec. 4, 2009, the disclosure content of which is hereby incorporated herein by reference.

FIELD OF THE INVENTION

The present invention relates to a tire having a radial carcass reinforcement and more particularly to a tire intended to equip heavy-goods vehicles running at sustained speed, such as, for example, lorries, tractors, trailers or buses.

BACKGROUND OF THE INVENTION

In general in heavy-goods vehicle tires, the carcass reinforcement is anchored on either side in the region of the bead and is surmounted radially by a crown reinforcement consisting of at least two superposed layers formed from threads or cords that are parallel in each layer and crossed from one layer to the next, making angles of between 10° and 45° with the circumferential direction. Said working layers, forming the working reinforcement, may further be covered with at least one protective layer formed from advantageously extensible metal reinforcing elements, called elastic elements. It may also comprise a layer of low-extensibility metal threads or cords making an angle of between 45° and 90° with the circumferential direction, this ply, called triangulation ply, being located radially between the carcass reinforcement and the first crown ply called the working ply, these being formed from parallel threads or cords at angles of at most equal to 45° in absolute value. The triangulation ply forms, with at least said working ply, a triangulated reinforcement which undergoes, when subjected to the various stresses, little deformation, the essential role of the triangulation ply being to take up the transverse compressive forces to which all of the reinforcing elements in the crown region of the tire are subjected.

In the case of heavy-goods vehicle tires, a single protective layer is usually present and its protecting elements are, in most cases, oriented in the same direction and at the same angle in absolute value as those of the reinforcing elements of the radially outermost, and therefore radially adjacent, working layer. In the case of civil engineering vehicle tires, intended for running on more or less uneven ground, the presence of two protective layers is advantageous, the reinforcing elements being crossed from one layer to the next and the reinforcing elements of the radially inner protective layer being crossed with the inextensible reinforcing elements of the radially outer working layer adjacent to said radially inner protective layer.

The circumferential direction, or longitudinal direction, of the tire is the direction corresponding to the periphery of the tire and defined by the running direction of the tire.

The transverse or axial direction of the tire is parallel to the rotation axis of the tire.

The radial direction is a direction cutting the rotation axis of the tire and perpendicular thereto.

The rotation axis of the tire is the axis about which it rotates in normal use.

A radial or meridian plane is a plane that contains the rotation axis of the tire.

The circumferential median, or equatorial, plane is a plane perpendicular to the rotation axis of the tire and that divides the tire into two halves.

Certain current "road" tires are intended to run at high speed on increasingly long journeys, because of the improvements in road networks and the growth of motorway networks throughout the world. All the conditions, under which such a tire is called upon to run, without doubt enable the tire to be run for a larger number of kilometers, since the wear of the tire is less. However, the endurance of this tire is prejudiced. To permit one or even two retreading operations on such tires, so as to extend their lifetime, it is necessary to preserve a structure and especially a carcass reinforcement with endurance properties which are sufficient to withstand said retreading operations.

Prolonged running under particularly severe conditions of tires thus constructed effectively introduces limits in terms of endurance of these tires.

The elements of the carcass reinforcement are in particular subjected to flexural and compressive stresses during running which adversely affect their endurance. The cords that make up the reinforcing elements of the carcass layers are in fact subjected to large stresses when the tires are running, especially to repeated flexural stresses or variations in curvature, leading to friction between the threads, and therefore wear and fatigue: this phenomenon is termed "fatigue fretting".

To fulfill their function of strengthening the carcass reinforcement of the tire, said cords must firstly have good flexibility and a high endurance in flexure, which means in particular that their threads have to have a relatively small diameter, preferably less than 0.28 mm, more preferably less than 0.25 mm, generally smaller than that of the threads used in conventional cords for the crown reinforcements of tires.

The cords of the carcass reinforcement are also subject to the phenomenon of "fatigue-corrosion" due to the very nature of the cords, which promote the passage of corrosive agents such as oxygen and moisture or even drain said agents. Specifically, air or water penetrating the tire, for example as a result of degradation following a cut or more simply because of the permeability, albeit low, of the inner surface of the tire, may be conveyed by the channels formed within the cords because of their very structure.

All these fatigue phenomena, which are generally grouped together under the generic term "fatigue-fretting-corrosion", are the cause of progressive degradation of the mechanical properties of the cords and may, under the severest running conditions, affect the lifetime of said cords.

To improve the endurance of these cords of the carcass reinforcement, it is known in particular to increase the thickness of the rubber layer that forms the internal wall of the cavity of the tire in order to minimize the permeability of said layer. This layer is usually composed partly of butyl rubber so as to better seal the tire. This type of material has the drawback of increasing the cost of the tire.

It is also known to modify the construction of said cords so as in particular to increase their penetrability by the rubber and thus limit or even eliminate the passage of oxidizing agents via the channels formed within the cords. Tires produced in this way have revealed problems of air pockets appearing during manufacture of the tire.

This is because the various manufacturing steps lead to the formation of occluded air pockets. In the case of tires comprising a carcass reinforcement formed from cords having a structure that forms channels able to conduct the air, these air pockets disappear owing to the diffusion of the air into the materials, especially through said channels existing within the cords. In the case of tires comprising a carcass reinforcement formed from cords having a structure which is highly penetrated by the rubber, these air pockets remain after the manufacturing steps. What appears is only a displacement of these air pockets during the step of curing the tire, said pockets being displaced towards regions where a low pressure is exerted. The displacement of the air takes place along the carcass reinforcement, along passages that exist between the reinforcing elements, the layers of rubber compound covering the reinforcing elements forming indentation zones parallel to the reinforcing elements before the step of curing the tire. These indentation zones thus permit the air to move slightly depending on the pressure that is exerted on the regions where the air pockets exist. The pressure or the pressure variations occur especially during the step of curing the tire or else during the conforming step, if it exists.

The appearance of these air pockets is usually unacceptable depending on their location, and may require scrapping the tires, as said air pockets may become zones of weakness in the tire. The manufacturing costs therefore become unacceptable simply because of the poor production yields.

SUMMARY OF THE INVENTION

The inventors were thus tasked with providing heavy-goods vehicles with tires the wear performance of which is maintained for road usage and in particular the endurance performance of which is improved, especially with regard to "fatigue-corrosion" or "fatigue-fretting-corrosion" phenomena, irrespective of the running conditions, in particular in terms of inflation, the manufacturing cost of said tires remaining acceptable.

This objective has been achieved according to one aspect of the invention directed to a tire having a radial carcass reinforcement, consisting of at least one layer of reinforcing elements, said tire comprising a crown reinforcement, which is itself covered radially with a tread, said tread being joined to two beads via two sidewalls, the reinforcing elements of at least one layer of the carcass reinforcement being metal cords having in what is called the permeability test a flow rate of less than 20 $cm^3$/min and at least 10% of said metal cords being wrapped with a strand consisting of textile multifilament yarns.

The cords are either stranded cords or layered cords, or stranded cords of layered cords, or layered cords comprising strands.

Stranded cords are cords consisting of strands or threads twisted together.

Layered cords or multi-layer cords are cords consisting of a central core and one or more practically concentric layers of strands or threads placed around this central core.

According to an embodiment of the invention, at least 10% of the carcass reinforcement cords are wrapped with an external wrapping thread or strand wound in a helix around said cord.

In what is called the permeability test it is possible to determine longitudinal permeability to air of the tested cords, by measuring the volume of air passing through a test specimen under constant pressure for a given time. The principle of such a test, well known to those skilled in the art, is to demonstrate the effectiveness of the treatment of a cord for making it impermeable to air. The test has been described for example in the standard ASTM D2692-98.

The test is carried out on cords directly extracted, by stripping, from the vulcanized rubber plies that they reinforce, and therefore on cords that have been penetrated by cured rubber. In the case of wrapped cords, the test is carried out after having removed the twisted or untwisted yarn used as wrapping strand.

The test is carried out on a 2 cm length of cord, and therefore coated with its surrounding rubber composition (or coating rubber) in the cured state, in the following manner: air is sent into the cord, under a pressure of 1 bar, and the volume of air leaving it is measured using a flowmeter (calibrated for example from 0 to 500 $cm^3$/min). During the measurement, the cord specimen is blocked in a compressed seal (for example a seal made of dense foam or rubber) in such a way that only the amount of air passing through the cord from one end to the other, along its longitudinal axis, is taken into account in the measurement. The sealing provided by the seal itself is checked beforehand using a solid rubber test specimen, that is to say one without a cord.

The measured average air flow rate (average over 10 test specimens) is lower the higher the longitudinal impermeability of the cord. Since the measurement is made with an accuracy of ±0.2 $cm^3$/min, the measured values equal to or less than 0.2 $cm^3$/min are considered to be zero and correspond to a cord that may be termed airtight (completely airtight) along its axis (i.e. in its longitudinal direction).

This permeability test also constitutes a simple means of indirectly measuring the degree of penetration of the cord by a rubber composition. The measured flow rate is lower the higher the degree of penetration of the cord by the rubber.

Cords having in what is called the permeability test a flow rate of less than 20 $cm^3$/min have a degree of penetration greater than 66%.

Cords having in what is called the permeability test a flow rate of less than 20 $cm^3$/min have a degree of penetration greater than 90%.

The degree of penetration of a cord may also be estimated using the method described below. In the case of a layered cord, the method consists firstly in removing the outer layer on a specimen having a length between 2 and 4 cm and then measuring, along a longitudinal direction and along a given axis, the sum of the lengths of rubber compound divided by the length of the specimen. These rubber compound length measurements exclude the spaces not penetrated along this longitudinal axis. These measurements are repeated along three longitudinal axes distributed over the periphery of the specimen and repeated on five cord specimens.

When the cord comprises several layers, the first, removal step is repeated with the newly external layer and the rubber compound lengths measured along longitudinal axes.

All the ratios of rubber compound lengths to specimen lengths thus determined are then averaged so as to define the degree of penetration of the cord.

The inventors have demonstrated that a tire produced in this way according to the invention leads to very advantageous improvements in terms of the compromise between endurance and manufacturing cost. Indeed, the endurance properties of such a tire are equivalent to those of the solutions mentioned above. The presence of cords of the carcass reinforcement having a flow rate of less than 20 $cm^3$/min in what is called the permeability test makes it possible to limit the risks due to corrosion. Furthermore, the presence of at least 10% of these cables comprising a wrapping consisting of textile multifilament yarns makes it possible to drain the occluded air during manufacture of the tire and therefore results in higher productivity than that mentioned above and therefore lower costs. The inventors have demonstrated that a number of cords comprising at least one strand consisting of textile multifilament yarns greater than 10% makes it possible for the occluded air to meet a "drain" either right from the formation of an air pocket or upon said air pocket being displaced along a direction parallel to the reinforcing elements of the carcass reinforcement layer during the steps of manufacturing the tire, as was mentioned previously. The tests carried out have confirmed that the results obtained with cords comprising a wrapping strand consisting of textile multifilament yarns in these amounts are out of all proportion with those obtained with carcass reinforcement layers comprising only non-wrapped metal cords having in what is called the permeability test a flow rate of less than 20 cm$^3$/min. This is because the presence of at least 5% of cords comprising at least one strand consisting of textile multifilament yarns makes it possible to maintain practically all the tires thus manufactured and therefore to bring the manufacturing unit cost back down to acceptable values.

According to one advantageous embodiment of the invention, said strand consists of textile multifilament yarns having a diameter of less than 0.15 mm. Such diameters of the coiled wrapping make it possible to maintain a satisfactory endurance of the polymer blends present between the reinforcing elements of the carcass reinforcement layer, for step values for placing the reinforcing elements of the carcass reinforcement layer that are imposed by the usage of the tire. This is because said polymer blends, which are subjected, especially in the sidewalls of the tire, to shear stresses when the tire is running under normal operating conditions, have an endurance that depends in particular on the distance between adjacent reinforcing elements.

According to preferred embodiments of the invention, the textile multifilament yarns of the wrapping are made of nylon or polyethylene terephthalate (PET).

The textile multifilament yarns of the wrapping may also be made of rayon, cotton, aramid, etc.

According to other embodiments of the invention, the textile wrapping strand is of hybrid type and combines one or more types of filamentary yarns mentioned above.

Advantageously according to an embodiment of the invention, the diameter of said at least 10% of cords comprising a wrapping strand consisting of textile multifilament yarns is less than 1.25 times the diameter of the non-wrapped metal cords.

Also advantageously, the diameter of said at least 10% of cords comprising a wrapping strand consisting of textile multifilament yarns is less than 1.1 times the diameter of the non-wrapped metal cords.

According to a preferred embodiment of the invention, all the reinforcing elements of at least one carcass reinforcement layer are metal cords having in what is called the permeability test a flow rate of less than 20 cm$^3$/mn, these being wrapped with a strand consisting of textile multifilament yarns. The drainage capacity is then over designed compared with the amounts of air and moisture that may be present during manufacture of the tire. However, the preparation of the carcass reinforcement layers is simplified from an industrial standpoint since, according to this embodiment, only one type of cord is required to prepare the carcass reinforcement layers: it is unnecessary to have to manage two different types of cord.

In the case of a carcass reinforcement comprising several layers of reinforcing elements, each of said layers may be in accordance with the invention. Advantageously at least the radially outer layer comprises metal cords having in what is called the permeability test a flow rate of less than 20 cm$^3$/min and at least 10% of said metal cords are wrapped with a strand consisting of textile multifilament yarns. This choice is particularly advantageous for ensuring complete evacuation of the air pockets that form during manufacture of the tire, these essentially appearing on the axially and/or radially external surface of the carcass reinforcement during manufacture.

According to one advantageous embodiment of the invention, said metal reinforcing elements having in what is called the permeability test a flow rate of less than 20 cm$^3$/min of at least one layer of the carcass reinforcement are cords having at least two layers, at least one inner layer being sheathed with a layer consisting of a polymeric composition such as a crosslinkable or crosslinked rubber composition, preferably one based on at least one diene elastomer.

Again preferably according to the invention, the cords of the carcass reinforcement have in what is called the permeability test a flow rate of less than 10 cm$^3$/min and more preferably less than 2 cm$^3$/min.

Another aspect of the invention provides a tire having a radial carcass reinforcement consisting of at least one layer of reinforcing elements, said tire comprising a crown reinforcement, which is itself covered radially with a tread, said tread being joined to two beads via two sidewalls, the reinforcing elements of at least one layer of the carcass reinforcement being metal cords having at least two layers, at least one inner layer being sheathed with a layer consisting of a polymeric composition such as a crosslinkable or crosslinked rubber composition, preferably one based on at least one diene elastomer, and at least 10% of said metal cords being wrapped with a strand consisting of textile multifilament yarns.

The expression "composition based on at least one diene elastomer" is understood to mean, as is known, that the composition comprises predominantly (i.e. with a mass fraction greater than 50%) this or these diene elastomers.

It should be noted that the sheath according to the invention extends continuously around the layer that it covers (that is to say this sheath is continuous in the "orthoradial" direction of the cord, which is perpendicular to its radius) so as to form a continuous sleeve having a cross section that is advantageously almost circular.

It should also be noted that the rubber composition of this sheath is crosslinkable or crosslinked, that is to say it includes, by definition, a suitable crosslinking system thus allowing the composition to crosslink while it undergoes curing (i.e. it cures and does not melt). Thus, this rubber composition may be termed "non-melting", because it cannot be melted by heating it to any temperature.

The term "diene" elastomer or rubber is understood, as is known, to mean an elastomer derived at least partly (i.e. a homopolymer or a copolymer) from diene monomers (monomers carrying two carbon-carbon double bonds, whether conjugated or not).

Diene elastomers, in a known manner, may be put into two categories: those called "essentially unsaturated" diene elastomers and those called "essentially saturated" diene elastomers. In general, an "essentially unsaturated" diene elastomer is understood here to mean a diene elastomer derived at least partly from conjugated diene monomers having an original content of diene units (conjugated dienes) which is greater than 15% (mol %). Thus, for example, diene elastomers such as butyl rubbers or copolymers of dienes and α-olefins of the EPDM type do not fall within the above definition and in particular can be termed "essentially saturated" diene elastomers (having an original content of diene units that is low or very low and always less than 15%). In the category of "essentially unsaturated" diene elastomers, the term "highly unsaturated" diene elastomer is understood to mean in particular a diene elastomer having an original content of diene units (conjugated dienes) of greater than 50%.

Given these definitions, a diene elastomer that can be used in the cord according to the invention is understood more particularly to mean:
(a) any homopolymer obtained by polymerizing a conjugated diene monomer having from 4 to 12 carbon atoms;
(b) any copolymer obtained by copolymerizing one or more conjugated dienes with one another or with one or more aromatic vinyl compounds having from 8 to 20 carbon atoms;
(c) a ternary copolymer obtained by copolymerizing ethylene, an α-olefin having 3 to 6 carbon atoms with an unconjugated diene monomer having from 6 to 12 carbon atoms, such as for example, the elastomers obtained from ethylene or propylene with an unconjugated diene monomer of the aforementioned type, such as for example 1,4-hexadiene, ethylidene norbornene and dicyclopentadiene;
(d) an isobutene/isoprene copolymer (butyl rubber), and also halogenated, in particular chlorinated or brominated versions of this type of copolymer.

Although it applies to any type of diene elastomer, the present invention is primarily implemented with essentially unsaturated diene elastomers, in particular of type (a) or (b) above.

Thus, the diene elastomer is preferably chosen from the group formed by polybutadienes (BR), natural rubber (NR), synthetic polyisoprenes (IR), various butadiene copolymers, various isoprene copolymers and blends of these elastomers. More preferably, such copolymers are chosen from the group formed by stirene-butadiene copolymers (SBR), butadiene-isoprene copolymers (BIR), stirene-isoprene copolymers (SIR) and stirene-butadiene-isoprene copolymers (SBIR).

More preferably according to an embodiment of the invention, the diene elastomer chosen predominantly (i.e. in respect of more than 50 phr) consists of an isoprene elastomer. The term "isoprene elastomer" is understood to mean, as is known, an isoprene homopolymer or copolymer, in other words a diene elastomer chosen from the group formed by natural rubber (NR), synthetic polyisoprenes (IR), various isoprene copolymers and blends of these elastomers.

According to one advantageous embodiment of the invention, the diene elastomer chosen consists exclusively (i.e. for 100 phr) of natural rubber, synthetic polyisoprene or a blend of these elastomers, the synthetic polyisoprene having a content (in mol %) of 1,4-cis bonds preferably greater than 90%, and even more preferably greater than 98%.

It would also be possible to use, according to one particular embodiment of the invention, cuts (blends) of this natural rubber and/or these synthetic polyisoprenes with other highly unsaturated diene elastomers, especially with SBR or BR elastomers as mentioned above.

The rubber sheath of the cord of the invention may contain one or more diene elastomers, it being possible for these to be used in combination with any type of synthetic elastomer other than those of diene type, or even with polymers other than elastomers, for example thermoplastic polymers, these polymers other than elastomers then being present by way of minority polymer.

Although the rubber composition of said sheath is preferably devoid of any plastomer and contains only a diene elastomer (or blend of diene elastomers) as polymeric base, said composition could also include at least one plastomer with a mass fraction $x_p$ which is less than the mass fraction $x_e$ of the elastomer(s). In such a case, the following relationship preferably applies: $0<x_p<0.5x_e$ and more preferably the following relationship applies: $0<x_p<0.1x_e$.

Preferably, the crosslinking system of the rubber sheath is a system called a vulcanization system, that is to say one based on sulphur (or on a sulphur donor) and a primary vulcanization accelerator. Added to this base vulcanization system may be various known secondary vulcanization accelerators or vulcanization activators. Sulphur is used with a preferential amount of between 0.5 and 10 phr, more preferably between 1 and 8 phr, and the primary vulcanization accelerator, for example a sulphonamide, is used with a preferential amount of between 0.5 and 10 phr, more preferably between 0.5 and 5.0 phr.

The rubber composition of the sheath according to the invention includes, besides said crosslinking system, all the common ingredients that can be used in rubber compositions for tires, such as reinforcing fillers based on carbon black and/or an inorganic reinforcing filler such as silica, anti-ageing agents, for example antioxidants, extender oils, plasticizers or processing aids, which make it easier to process the compositions in the uncured state, methylene donors and acceptors, resins, bismaleimides, known adhesion promoter systems of the RFS (resorcinol-formaldehyde-silica) type or metal salts, especially cobalt salts.

Preferably, the composition of the rubber sheath has, in the crosslinked state, a secant modulus in extension with 10% elongation (denoted M10), measured according to the ASTM D 412 (1998) standard, of less than 20 MPa and more preferably less than 12 MPa, in particular between 4 and 11 MPa.

Preferably, the composition of this sheath is chosen to be the same as the composition used for the rubber matrix that the cords according to the invention are intended to reinforce. Thus, there is no problem of any incompatibility between the respective materials of the sheath and the rubber matrix.

Preferably, said composition is based on natural rubber and contains carbon black as reinforcing filler, for example a carbon black of ASTM 300, 600 or 700 grade (for example N326, N330, N347, N375, N683 or N772).

According to a variant of the invention, the reinforcing elements of at least one layer of the carcass reinforcement having in what is called the permeability test a flow rate of less than 20 cm$^3$/min are layered metal cords of [L+M] or [L+M+N] construction, comprising a first layer C1 having L threads of diameter $d_1$ where L ranges from 1 to 4, surrounded by at least one intermediate layer C2 having M threads of diameter $d_2$ wound together in a helix with a pitch $p_2$ where M ranges from 3 to 12, said layer C2 being optionally surrounded by an outer layer C3 of N threads of diameter $d_3$ wound together in a helix with a pitch $p_3$ where N ranges from 8 to 20, a sheath consisting of a crosslinkable or crosslinked rubber composition based on at least one diene elastomer covering, in the [L+M] construction, said first layer C1 and, in the [L+M+N] construction, at least said layer C2.

Preferably, the diameter of the threads of the first layer of the inner layer (C1) is between 0.10 and 0.5 mm and the diameter of the threads of the outer layers (C2, C3) is between 0.10 and 0.5 mm.

More preferably, the helix pitch with which said threads of the outer layer (C3) are wound is between 8 and 25 mm.

Within the meaning of the invention, the pitch represents the length, measured parallel to the axis of the cord, at the end of which a thread having this pitch makes one complete turn around the axis of the cord; thus, if the axis is sectioned by two planes perpendicular to said axis and separated by a length equal to the pitch of a thread of a constituent layer of the cord, the axis of this thread in these two planes has the same position on the two circles corresponding to the layer of the thread in question.

Advantageously, the cord has one, and more preferably still all of the following characteristics, which is/are satisfied:

the layer C3 is a saturated layer, that is to say there exists insufficient space in this layer to add to it at least an (N+1) the thread of diameter $d_3$, N then representing the maximum number of threads that can be wound as a layer around the layer C2;

the rubber sheath furthermore covers the inner layer C1 and/or separates the pairwise adjacent threads of the intermediate layer C2;

the rubber sheath covers practically the radially inner semi-circumference of each thread of the layer C3 in such a way that it separates the pairwise adjacent threads of this layer C3.

In the L+M+N construction according to the invention, the intermediate layer C2 preferably comprises six or seven threads and the cord according to the invention then has the following preferential characteristics ($d_1$, $d_2$, $d_3$, $p_2$ and $p_3$ in mm):

(i) $0.10 < d_1 < 0.28$;
(ii) $0.10 < d_2 < 0.25$;
(iii) $0.10 < d_3 < 0.25$;
(iv) M=6 or M=7;
(v) $5\pi(d_1+d_2) < p_2 \leq p_3 < 5\pi(d_1+2d_2+d_3)$;
(vi) the threads of said layers C2, C3 are wound in the same twist direction (S/S or Z/Z).

Preferably, characteristic (v) is such that $p_2=p_3$, in such a way that the cord is said to be "compact" considering moreover characteristic (vi) (threads of the layers C2 and C3 wound in the same direction).

According to characteristic (vi), all the threads of the layers C2 and C3 are wound in the same twist direction, that is to say either in the direction S ("S/S" arrangement) or in the direction Z ("Z/Z" arrangement). By winding the layers C2 and C3 in the same direction, it is advantageously possible in the cord according to the invention to minimize the friction between these two layers C2 and C3 and therefore the wear of the threads constituting them (since there is no longer crossed contact between the threads).

Preferably, said metal cords of at least one layer of the carcass reinforcement having in what is called the permeability test a flow rate of less than 20 cm³/min are layered cords of 1+M+N construction, that is to say that the inner layer C1 consists of a single thread.

Again advantageously, the ($d_1/d_2$) ratios are preferably set within given limits, according to the number M (6 or 7) of threads in the layer C2, as follows:

for M=6: $0.9 < (d_1/d_2) < 1.3$;
for M=7: $1.3 < (d_1/d_2) < 1.6$.

Too low a value of the ratio $d_1/d_2$ may be prejudicial to wear between the inner layer and the threads of the layer C2. As for too high a value, this may impair the compactness of the cord, for a barely modified definitive level of strength, and may also impair its flexibility. The greater rigidity of the inner layer C1 due to too high a diameter $d_1$ could moreover be prejudicial to the very feasibility of the cord during the cabling operations.

The threads of the layers C2 and C3 may have the same diameter or this may differ from one layer to the other. Preferably, threads of the same diameter ($d_2=d_3$) are used, especially to simplify the cabling process and to lower the costs.

The maximum number $N_{max}$ of threads that can be wound as a single saturated layer C3 around the layer C2 depends of course on many parameters (diameter $d_1$ of the inner layer, number M and diameter $d_2$ of the threads of the layer C2, and diameter $d_3$ of the threads of the layer C3).

Said metal cords of at least one layer of the carcass reinforcement having in what is called the permeability test a flow rate of less than 20 cm³/min are preferably chosen from cords of 1+6+10, 1+6+11, 1+6+12, 1+7+11, 1+7+12 or 1+7+13 construction.

For a better compromise between strength, feasibility and flexural endurance of the cord, on the one hand, and penetrability by the rubber on the other hand, it is preferred for the diameters of the threads of the layers C2 and C3, whether identical or not, to be between 0.12 mm and 0.22 mm.

In such a case, it is preferred to have the following relationships satisfied:

$0.14 < d_1 < 0.22$;
$0.12 < d_2 \leq d_3 < 0.20$;
$5 < p_2 \leq p_3 < 12$ (small pitches in mm) or else $20 < p_2 \leq p_3 < 30$ (large pitches in mm).

A diameter less than 0.19 mm helps reduce the level of stresses undergone by the threads during the large variations in curvature of the cords, while it is preferred to choose diameters greater than 0.16 mm in particular for thread strength and industrial cost reasons.

One advantageous embodiment consists for example in choosing $p_2$ and $p_3$ to be between 8 and 12 mm, advantageously with cords of 1+6+12 construction.

Preferably, the rubber sheath has an average thickness ranging from 0.010 mm to 0.040 mm.

In general, said metal cords of at least one layer of the carcass reinforcement having in what is called the permeability test a flow rate of less than 20 cm³/min according to the invention may be implemented with any type of metal thread, especially steel thread, for example carbon steel threads and/or stainless steel threads. It is preferred to use a carbon steel but of course it is possible to use other steels or other alloys.

When a carbon steel is used, its carbon content (% by weight of steel) is preferably between 0.1% and 1.2%, more preferably from 0.4% to 1.0%. These contents represent a good compromise between the required mechanical properties of the tire and the feasibility of the thread. It should be noted that a carbon content of between 0.5% and 0.6% makes such steels ultimately less expensive, as they are easier to draw. Another advantageous embodiment of the invention may also consist, depending on the intended applications, in using low carbon steels, for example having a carbon content of between 0.2% and 0.5%, especially because they have a lower cost and drawing is much easier.

Said metal cords of at least one layer of the carcass reinforcement having in what is called the permeability test a flow rate of less than 20 cm³/min according to the invention may be obtained by various techniques known to those skilled in the art, for example, in two steps: firstly a step in which the L+M intermediate structure or core (layers C1+C2) is sheathed via an extrusion head, which step is followed, secondly, by a final operation in which the N remaining threads (layer C3) are cabled or twisted around the thus sheathed layer C2. The problem of bonding in the uncured state posed by the rubber sheath, during possible intermediate winding and unwinding operations, may be solved in a manner known to those skilled in the art, for example by using an intermediate plastic film.

As regards the at least 10% of the metal cords that are wrapped with a strand consisting of textile multifilament yarns, said strand is wound in a helix around said cords in the final step of manufacturing said cords.

According to a preferred embodiment of the invention, the pitch of the helix that the wrapping strand forms around the outer layer of the cord is greater than 5 mm and more preferably greater than 15 mm. These values of the pitch make it possible to minimize the risks due to the presence of a wrapping, especially as regards the endurance of the cord.

More preferably, the braiding direction of the wrapping strand is identical to the braiding direction of the outer layer of the cord.

According to one embodiment of the invention, the crown reinforcement of the tire is formed from at least two working crown layers of inextensible reinforcing elements, which are crossed from one layer to the other making angles of between 10° and 45° with the circumferential direction.

According to other embodiments of the invention, the crown reinforcement also includes at least one layer of circumferential reinforcing elements.

A preferred embodiment of the invention also provides for the crown reinforcement to be supplemented, radially to the outside, by at least one supplementary, protective layer consisting of elastic reinforcing elements oriented to the circumferential direction at an angle of between 10° and 45° and in the same sense as the angle made by the inextensible elements of the working layer that is radially adjacent thereto.

The protective layer may have an axial width smaller than the axial width of the narrowest working layer. Said protective layer may also have an axial width greater than the axial width of the narrowest working layer, such that it covers the edges of the narrowest working layer and, in the case of the radially upper layer being the narrowest, such that it is coupled, in the axial extension of the additional reinforcement, to the widest working crown layer over an axial width so as thereafter, axially to the outside, to be decoupled from said widest working layer by profiled elements having a thickness of at least 2 mm. The protective layer formed from elastic reinforcing elements may, in the abovementioned case, on the one hand, be optionally decoupled from the edges of said narrowest working layer by profiled elements having a thickness substantially less than the thickness of the profiled elements separating the edges of the two working layers and, on the other hand, have an axial width smaller or larger than the axial width of the widest crown layer.

According to any of the embodiments of the invention mentioned above, the crown reinforcement may also be supplemented, radially to the inside between the carcass reinforcement and the radially internal working layer closest to said carcass reinforcement, with a triangulation layer of inextensible metal reinforcing elements made of steel making, with the circumferential direction, an angle of greater than 60° and in the same sense as that of the angle made by the reinforcing elements of the radially closest layer of the carcass reinforcement.

BRIEF DESCRIPTION OF THE DRAWINGS

Other details and advantageous features of the invention will become apparent below from the description of exemplary embodiments of the invention, in particular with reference to FIGS. 1 to 7 which show.

The figures have not been drawn to scale so as to make it simpler to understand them.

DETAILED DESCRIPTION OF THE DRAWINGS

Figure 1:
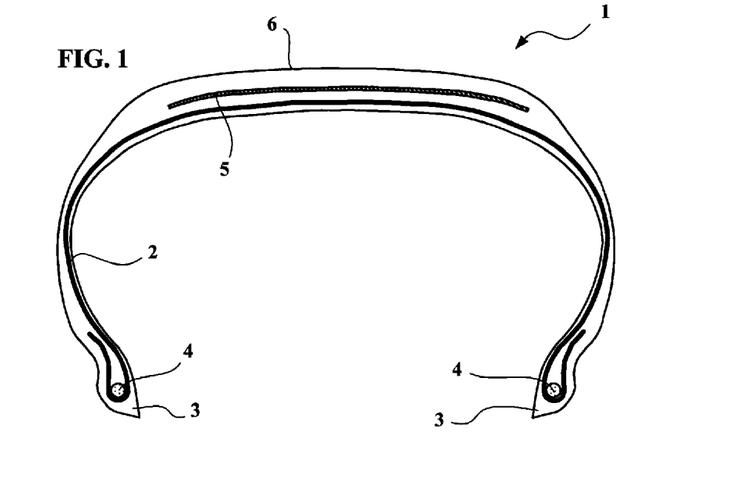
FIG. 1, a meridional view of a diagram showing a tire according to one embodiment of the invention.

In FIG. 1, the tire 1, of 315/70 R 22.5 type, comprises a radial carcass reinforcement 2 anchored in two beads 3 around bead wires 4. The carcass reinforcement 2 is formed by a single layer of metal cords. The carcass reinforcement 2 is wrapped with a crown reinforcement 5 which is itself covered with a tread 6. The crown reinforcement 5 is formed, radially from the inside to the outside, from:

a first working layer formed from continuous non-wrapped inextensible metal cords 11.35 over the entire width of the ply, said cords being oriented at an angle of 18°;

a second working layer formed from continuous non-wrapped inextensible metal cords 11.35 over the entire width of the ply, said cords being oriented at an angle of 18° and crossed with the metal cords of the first working layer; and a protective layer formed from elastic metal cords 6×35.

All these layers constituting the crown reinforcement 5 have not been shown in detail in the figures.

Figure 2:
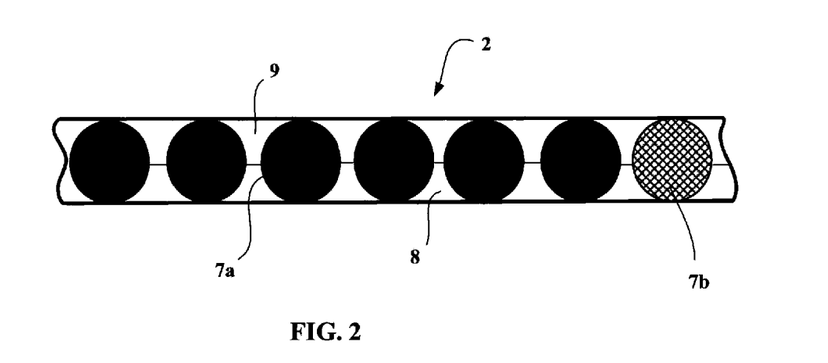
FIG. 2, a schematic representation in cross section of a carcass reinforcement layer of the tire shown in FIG. 1, according to one embodiment of the invention.

FIG. 2 illustrates a cross-sectional schematic representation of a carcass reinforcement layer 2 according to the invention, the cross section being in a plane perpendicular to the direction of orientation of the reinforcing elements. This layer consists of a set of cords 7a, 7b oriented parallel to one another and maintained between two layers 8, 9 of rubber compound, called calendering layers.

The reinforcing elements 7a, shown as filled circles in FIG. 2, represent the non-wrapped metal cords having in what is called the permeability test a flow rate of less than 20 cm$^3$/min and, in the present case, non-wrapped cords having at least two layers, at least an inner layer being sheathed with a layer which consists of a polymeric composition, such as a crosslinkable or crosslinked rubber composition. The element 7b, shown as a cross-hatched circle in FIG. 2, represent the at least 10% of cords comprising at least one wrapping strand consisting of textile multifilament yarns.

Figures 3, 4, 5:
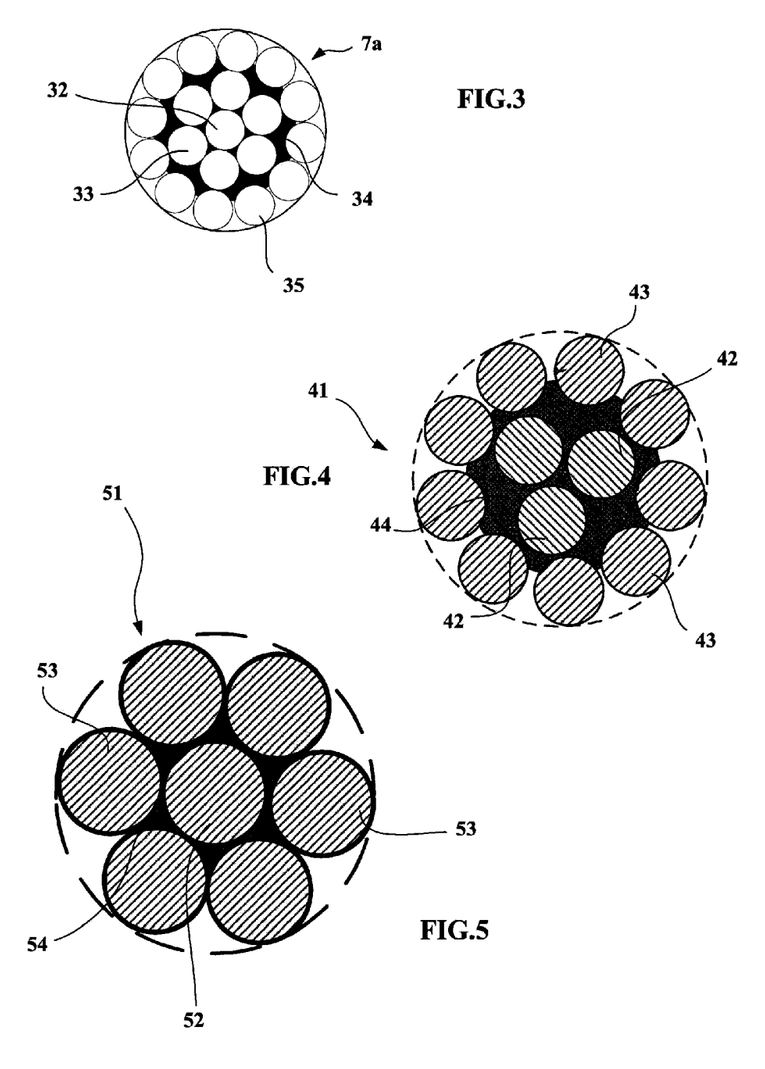
FIG. 3, a schematic representation of a cross-sectional view of a first example of a metal cord of at least one layer of the carcass reinforcement of the tire shown in FIG. 1.
FIG. 4, a schematic representation of a cross-sectional view of a second example of a metal cord of at least one layer of the carcass reinforcement of the tire shown in FIG. 1.
FIG. 5, a schematic representation of a cross-sectional view of a third example of a metal cord of at least one layer of the carcass reinforcement of the tire shown in FIG. 1.

FIG. 3 illustrates a schematic representation of the cross section through a carcass reinforcement cord 7a of the tire 1 shown in FIG. 1. This cord 7a is a non-wrapped layered cord of 1+6+12 construction, consisting of a central core formed by a thread 32, an intermediate layer formed from six threads 33 and an outer layer formed from twelve threads 35.

The cord has the following characteristics (d and p in mm):
1+6+12 construction;
$d_1 = 0.20$;
$d_2 = 0.18$;
$p_2 = 10$;
$d_3 = 0.18$;
$p_3 = 10$;
$(d_2/d_3) = 1$;

where $d_2$ and $p_2$ are, respectively, the diameter and the helix pitch of the intermediate layer and $d_3$ and $p_3$ are, respectively, the diameter and the helix pitch of the threads of the outer layer.

The core of the cord consisting of the central core formed from the thread 32 and from the intermediate layer formed from the six threads 33 is sheathed by a rubber composition 34 based on an unvulcanized diene elastomer (in the uncured state). Sheathing of the core, consisting of the thread 32 surrounded by the six threads 33, is carried out using an extrusion head, followed by a final operation of twisting or cabling the twelve threads 35 around the core thus sheathed.

The cord 7a has in what is called the permeability test, as described above, a flow rate equal to 0 cm$^3$/min and therefore less than 2 cm$^3$/min. Its penetration by the rubber composition is equal to 95%.

The cord 7a has a diameter of 0.95 mm.

The elastomer composition constituting the rubber sheath 34 is made from a composition as described above and has, in the present case, the same formulation, based on natural rubber and carbon black, as that of the calendering layers 8, 9 of the carcass reinforcement that the cords are intended to reinforce.

FIG. 4 illustrates a schematic representation of the cross section through another carcass reinforcement cord 41 that can be used in a tire according to the invention as a replacement for the cord of FIG. 3. This cord 41 is a non-wrapped layered cord of 3+9 construction consisting of a central core formed from a cord consisting of three threads 42 twisted together and an outer layer formed from nine threads 43.

This cord has the following characteristics (d and p in mm):
3+9 construction;
$d_1=0.18$;
$p_1=5$;
$(d_1/d_2)=1$;
$d_2=0.18$;
$p_2=10$, where $d_1$ and $p_1$ are, respectively, the diameter and the helix pitch of the threads of the central core and $d_2$ and $p_2$ are, respectively, the diameter and the helix pitch of the threads of the outer layer.

The central core consisting of a cord formed from three threads 42 was sheathed with a rubber composition 44 based on an unvulcanized diene elastomer (in the uncured state). The sheathing of the cord 42 is carried out by an extrusion head, followed by a final operation of cabling the nine threads 43 around the core thus sheathed.

The cord 41 has in what is called the permeability test, as described above, a flow rate equal to 0 cm$^3$/min and therefore less than 2 cm$^3$/min. Its penetration by the rubber composition is equal to 95%.

The cord 41 has a diameter of 1.0 mm.

FIG. 5 illustrates a schematic representation of the cross section through another carcass reinforcement cord 51 that can be used in a tire according to the invention as a replacement for the cord of FIG. 3. This cord 51 is a non-wrapped layered cord of 1+6 construction consisting of a central core formed from a thread 52 and an outer layer formed from six threads 53.

This cord has the following characteristics (d and p in mm):
1+6 construction;
$d_1=0.200$;
$(d_1/d_2)=1.14$;
$d_2=0.175$;
$p_2=10$, where $d_1$ is the diameter of the core and $d_2$ and $p_2$ are, respectively, the diameter and the helix pitch of the threads of the outer layer.

The central core consisting of the thread 52 was sheathed with a rubber composition 54 based on an unvulcanized diene elastomer (in the uncured state). The sheathing of the thread 52 is carried out by an extrusion head, followed by a final operation of cabling the six threads 53 around the core thus sheathed.

The cord 51 has in what is called the permeability test, as described above, a flow rate equal to 0 cm$^3$/min and therefore less than 2 cm$^3$/min. Its penetration by the rubber composition is equal to 95%.

The cord 51 has a diameter of 0.75 mm.

Figure 6:
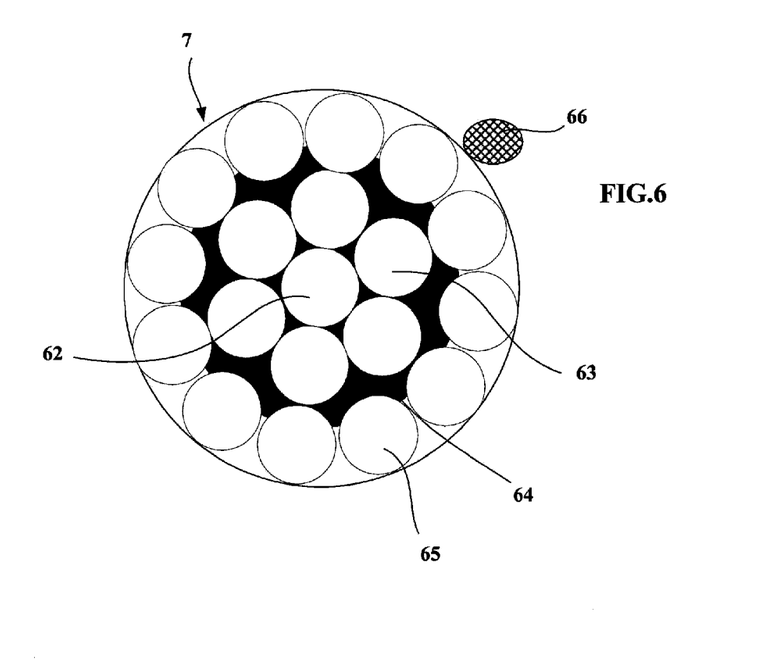
FIG. 6, a schematic representation of a layered cord comprising a wrapping strand consisting of textile multifilament yarns.

FIG. 6 illustrates a schematic representation of the cross section of a carcass reinforcement cord 7b of the tire 1 shown in FIG. 1. This cord 7b is a layered metal cord of 1+6+12 construction, consisting of a central core formed from a metal thread 61, an intermediate layer formed from six metal threads 63 and an outer layer formed from twelve metal threads 65.

It has the following characteristics (d and p in mm):
structure 1+6+12;
$d_1=0.20$;
$d_2=0.18$;
$p_2=10$;
$d_3=0.18$;
$p_3=10$;
$(d_2/d_3)=1$, where $d_2$ and $p_2$, are, respectively, the diameter and the helix pitch of the intermediate layer and $d_3$ and $p_3$ are, respectively, the diameter and the helix pitch of the threads of the outer layer.

The central member of the cable consisting of the central core formed from the aromatic polyamide thread 62 and of the intermediate layer formed from the six threads 63 is sheathed with a rubber composition 64 based on an unvulcanized diene elastomer (in the uncured state). The sheathing of the core consisting of the thread 62 surrounded by the six threads 63 is carried out by an extrusion head and is followed by a final operation of twisting or cabling the twelve threads 65 around the core thus sheathed.

It further includes a wrapping strand 66 consisting of nylon multifilament yarns, forming a helix around the layer consisting of twelve threads 65. The pitch of the helix formed by the wrapping strand 66 is 20 mm.

The cord 7b is therefore similar to the cord 7a of FIG. 3 but differs therefrom by the presence of a wrapping consisting of nylon multifilament yarns.

The cord 7b has a diameter of 1.17 mm.

According to other embodiments of the invention, not shown in the figures, in which the carcass reinforcement cords are made up of the cords illustrated in FIG. 4 or FIG. 5, the cords 7b could be similar to these cords and distinguish therefrom by the presence of a wrapping strand consisting of nylon multifilament yarns.

The carcass reinforcement layer of the tire 1 produced in accordance with FIGS. 1, 2, 3 and 6 comprises 90% of reinforcing elements 7a and 10% of reinforcing elements 7b.

Figure 7:
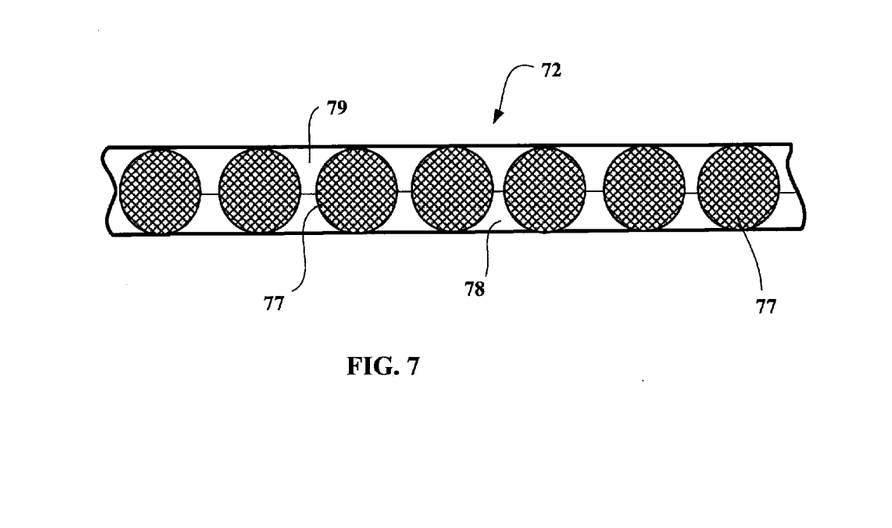
FIG. 7, a schematic cross-sectional representation of a carcass reinforcement layer of the tire of FIG. 1 according to an alternative embodiment of the invention.

FIG. 7 illustrates a schematic cross-sectional representation of a carcass reinforcement layer 72 according to one embodiment of the invention, the cross section being in a plane perpendicular to the direction of orientation of the reinforcing elements. This consists of a set of cords 77 oriented so as to be parallel to one another and held in place between two layers 78, 79 of rubber compound, called calendaring rubber.

The representation shown in FIG. 7 differs from that of FIG. 2 in that all the reinforcing elements of the carcass reinforcement layer are metal cords 77 having a wrapping strand consisting of nylon multifilament yarns, such as those shown in FIG. 6.

Trials were carried out on tires produced according to the invention as shown in FIGS. 1, 2, 3 and 6, while other trials were carried out on what are called control tires.

The control tires differ from the tires according to the invention by a carcass reinforcement in which the reinforcing elements are cords such as those shown in FIG. 3, but they do not include a sheathing layer. The carcass reinforcement therefore does not comprise cords wrapped with a strand consisting of textile multifilament yarns in accordance with the invention.

None of the tires thus produced, whether tires according to the invention or else control tires, showed any visible defect imputable to the presence of air or moisture.

Rolling drum endurance trials were carried out on a test machine imposing a load of 4415 daN on the tires, which were run at a speed of 40 km/h, with oxygen-doped inflation of the tires. The trials were carried out on the tires according to the invention under conditions identical to those applied to the control tires. The running tests were stopped as soon as the carcass reinforcement of the tires showed degradation.

The trials thus carried out showed that the distances traveled during each of these tests are favourable for the tires according to the invention, which ran for 300 000 km, whereas the control tires traveled only 250 000 km.

Other rolling endurance trials on a vehicle driving axle were carried out by imposing a load of 3680 daN on the tires, which were run at a speed of 40 km/h, with a tire pressure of 0.2 bar. The trials were carried out on the tires according to the invention under conditions identical to those applied to the control tires. The running tests were carried out over a distance of 12 000 km or were stopped as soon as the carcass reinforcement of the tires showed degradation.

The trials thus carried out showed that the distances traveled during each of these tests on the tires according to the invention could always reach around 12 000 km, whereas the control tires traveled at most only 10 000 km.

Furthermore, other types of tire were manufactured. These tires differ from the tires according to the invention by a carcass reinforcement comprising only cords 7a as shown in FIG. 3.

It turns out that most of these tires show visible defects on the sidewalls owing to the presence of air pockets that make the tires non-marketable. By producing tires in accordance with the invention it is possible to considerably reduce the number of non-marketable tires due to this type of defect in comparison with tires in which the carcass reinforcement comprises only cords as shown in FIG. 3.

The invention claimed is:

1. A tire comprising:
    a radial carcass reinforcement, comprising at least one layer of reinforcing elements having non-wrapped metal reinforcement elements and separate wrapped reinforcement elements;
    a tread; and
    a crown reinforcement, which is itself covered radially with the tread, said tread being joined to two beads via two sidewalls,
    wherein the at least one layer of reinforcing elements are metal cords having a permeability test a flow rate of less than 20 cm$^3$/min, and
    wherein at least 10% of said metal cords are wrapped with a strand including textile multifilament yarns.

2. The tire according to claim 1, wherein said strand includes textile multifilament yarns having a diameter of less than 0.15 mm.

3. The tire according to claim 1, wherein said metal reinforcing elements of at least one layer of the carcass reinforcement having the permeability test a flow rate of less than 20 cm$^3$/min are cords having at least two layers and wherein at least one inner layer is sheathed with a layer consisting of a polymeric composition configured as one of a crosslinkable or crosslinked rubber composition.

4. The tire according to claim 3, wherein said rubber composition is based on at least one diene elastomer.

5. The tire according to claim 1, wherein the cords have in what is called the permeability test a flow rate of less than 10 cm$^3$/min.

6. The tire according to claim 1, wherein the cords have in what is called the permeability test a flow rate of less than 2 cm$^3$/min.

7. A tire comprising:
    a radial carcass reinforcement comprising at least one layer of reinforcing elements having non-wrapped metal reinforcement elements and separate wrapped reinforcement elements;
    a tread; and
    a crown reinforcement, which is itself covered radially with the tread, said tread being joined to two beads via two sidewalls,
    wherein the at least one layer of reinforcing elements are metal cords having at least two layers, at least one inner layer being sheathed with a layer including a polymeric composition configured as one of a crosslinkable or crosslinked rubber composition, and
    wherein at least 10% of said metal cords are wrapped with a strand including textile multifilament yarns.

8. The tire according to claim 7, wherein said rubber composition is based on at least one diene elastomer.

9. The tire according to one of claim 1 or 7 wherein said reinforcing elements of at least one layer of the carcass reinforcement are layered metal cords of [L+M] or [L+M+N] construction, comprising a first layer C1 having L threads of diameter d1 where L ranges from 1 to 4, surrounded by at least one intermediate layer C2 having M threads of diameter d2 wound together in a helix with a pitch p2 where M ranges from 3 to 12, said layer C2 being optionally surrounded by an outer layer C3 of N threads of diameter d3 wound together in a helix with a pitch p3 where N ranges from 8 to 20, and wherein a sheath including a crosslinkable or crosslinked rubber composition based on at least one diene elastomer covers, in the [L+M] construction, said first layer C1 and, in the [L+M+N] construction, at least said layer C2.

10. The tire according to claim 9, wherein the diameter of the threads of the first layer C1 is between 0.10 and 0.5 mm, and wherein the diameter of the threads of the layers C2, C3 is between 0.10 and 0.5 mm.

11. The tire according to claim 9, wherein said threads of the outer layer C3 are helically wound with a helix pitch of between 8 and 25 mm.

12. The tire according to one of claim 3 or 7 wherein the polymeric composition is a diene elastomer that is selected from the group consisting of polybutadienes, natural rubber, synthetic polyisoprenes, butadiene copolymers, isoprene copolymers, and blends of these elastomers.

13. The tire according to one of claim 3 or 7,
    wherein the polymeric composition is a diene elastomer and
    wherein the crosslinkable or crosslinked rubber composition based on at least one diene elastomer has, in the crosslinked state, a secant modulus in extension of less than 20 MPa.

14. The tire according to one of claim 3 or 7, wherein the crosslinkable or crosslinked rubber composition is based on at least one diene elastomer and has, in the crosslinked state, a secant modulus in extension of less than 12 MPa.

* * * * *